United States Patent [19]

Boissonnault

[11] 4,166,286

[45] Aug. 28, 1979

[54] ENCAPSULATED PLANNAR CHIP CAPACITOR

[76] Inventor: John G. Boissonnault, 23 Wildwood Dr., Saco, Me. 04072

[21] Appl. No.: 805,673

[22] Filed: Jun. 13, 1977

Related U.S. Application Data

[63] Continuation-in-part of Ser. No. 699,159, Jun. 23, 1976, abandoned.

[51] Int. Cl.² ............................................... H01G 9/00
[52] U.S. Cl. .................................................... 361/433
[58] Field of Search ......................................... 361/433

[56] References Cited

U.S. PATENT DOCUMENTS

| 3,292,053 | 12/1966 | DiGiacomo | 361/433 |
|---|---|---|---|
| 3,296,505 | 1/1967 | Sparrow et al. | 361/433 |
| 3,611,054 | 10/1971 | Piper et al. | 361/433 |
| 3,789,274 | 1/1974 | Pfister et al. | 361/433 |
| 3,855,505 | 12/1974 | Karlik, Jr. et al. | 361/433 |
| 4,059,887 | 11/1977 | Galvagni | 29/570 |

Primary Examiner—James W. Davie
Attorney, Agent, or Firm—Auslander & Thomas

[57] ABSTRACT

A volumetrically efficient solid electrolyte capacitor includes a metal container electrode with a capacitor chip sealed with a conductive sealant, sealed against heat, moisture and handling damage.

6 Claims, 2 Drawing Figures

FIG.1
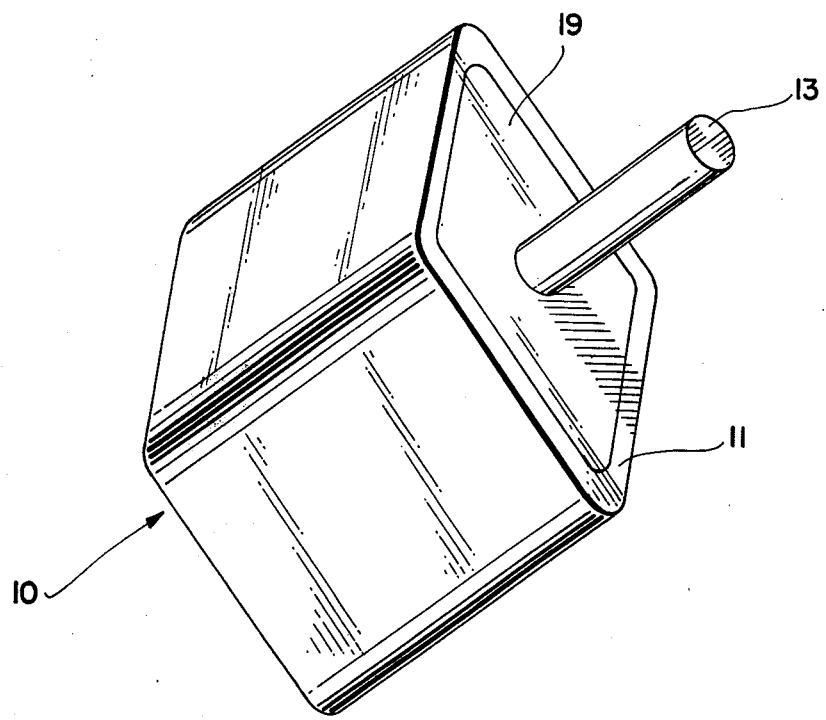
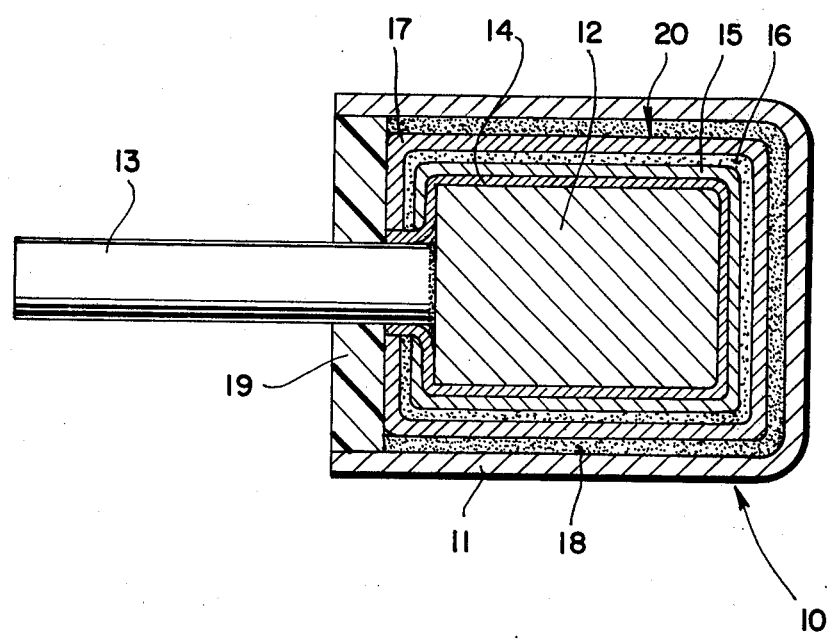
FIG.2

ENCAPSULATED PLANNAR CHIP CAPACITOR

The present invention is a continuation in part of my application Ser. No. 699,159 dated June 23, 1976 for an Encapsulated Planar Chip Capacitor and Method, now abandoned.

The present invention relates to a dry solid electrolyte capacitor such as a sintered tantalum capacitor having a conductive container counterelectrode (cathode).

The highly desirable advantages of dry solid electrolyte capacitors such as capacitors of sintered tantalums has been somewhat frustrated by their need for proper encapsulation.

Encapsulated conventional epoxy tantalum capacitors had bulk and required connection to two leads for use. Although the anode might be embedded in the sintered tantalum pellet, a cathode lead had to be attached, oftentimes by solder.

Some tantalum capacitors had cathode leads attached to the silvered cathode body by having mylar shrunk to the body, then having the capacitor sealed in a protective sleeve.

The advantage of using the counterelectrode body as an electrode or contact in lieu of a lead was recognized in U.S. Pat. No. 3,789,274 where a tantalum capacitor without a container was prepared for soldering directly to a circuit. In U.S. Pat. No. 3,789,274, great pains were taken to provide coatings which would not increase the equivalent series resistance of the capacitor, particularly when being soldered to a circuit.

The unencased capacitor of the U.S. Pat. No. 3,789,274 and the prior art had the distinct disadvantage of being endangered by handling or by soldering, which counterbalanced its relatively low equivalent series resistance and ease of production.

Capacitors of the U.S. Pat. No. 3,789,274 had a further advantage. They could be provided with planar surfaces which made them easier to handle and adopted for automation techniques of assemblance.

In my application Ser. No. 699,159, the advantage of the planar construction was emphasized in a dry electrolyte sintered tantalum capacitor. The capacitor disclosed therein had the adaptability to be attached to a circuit using the planar surfaces as could be used with the U.S. Pat. No. 3,789,274 without the risks of damage or degradation, particularly while being soldered to a circuit, and while keeping the equivalent series resistance to a minimum. The container of my No. 699,159 application capacitor became a part of the counter-electrode (cathode) as hereinafter described, is a simple, inexpensive construction.

According to the present invention, a dry electrolyte sintered metal capacitor such as a sintered tantalum capacitor is provided, sealed in a conductive container. The container may be directly connected to a circuit by soldering. The method for assembly is disclosed.

The present construction is particularly adaptable to a planar construction of the capacitor.

The sealed capacitor of the present invention has good equivalent series and high volumetric efficiency. The capacitor of the present invention can be soldered without risk of increasing the equivalent series resistance or damage to the sensitive internal layers. The encapsulation particularly protects the manganese dioxide layer against moisture degradation.

Although such novel feature or features believed to be characteristic of the invention are pointed out in the claims, the invention and the manner in which it may be carried out, may be further understood by reference to the description following and the accompanying drawings.

FIG. 1 is an oblique view of an encapsulated capacitor of the present invention.

FIG. 2 is a section elevation of the capacitor of FIG. 1.

Referring now to the figures in greater detail, where like reference numbers denote like parts in the various figures.

The encapsulated capacitor 10 as shown in the figures, includes a container 11 with a planar configuration. As can be seen in FIG. 2, a solid electrolyte 12, such as a sintered tantalum pellet, includes an embedded lead wire 13 anode. The electrolyte 12 is conventionally prepared with prior art layers of dielectric 14 such as $Ta_2O_5$ suitably formed on the outer surface of the solid electrolyte 12 and a layer of semiconductive material 15 such as $MnO_2$.

Also, a low resistance carbon layer 16 is provided outside the $MnO_2$ layer 15 to maintain a low series resistance of the capacitor 10 anode. The carbon layer 16 may be graphite or "Aquadag". A further conductive layer 17 of silver paint or copper plasma may further protect the carbon layer and assists conductivity.

The processed chip 20 is held in the container 11 by a conductive adhesive 18 sealant, preferably a high temperature silver epoxy. The container is sealed with a sealant 19 such as conventional epoxy, silicones, plastic resins or the like.

In assembling the capacitor 10 of the present invention, the conventional state of the art tantalum processed chip 20, usually processed through its conductive layer 17 is placed into the container 11 which has first had introduced into it a metered amount of conductive adhesive 18.

The container 11 preferably is just large enough to accommodate the chip 20 snugly. The amount of conductive adhesive 18 metered into the container 11 must be carefully calculated to volumetrically fill the container 11, surrounding the chip 20 and sealing it so that there is no gap between container 11 and the chip 20. Control must be exercised to prevent too much adhesive 18 from being used since an overflow conductive adhesive 18 reaching the lead wire 13 would short out the capacitor 10.

The adhesive 18 must be highly conductive in order to maintain a low equivalent series resistance of the capacitor 10. Silver epoxy adhesive 18 is selected for the conductivity of the silver and its relatively low cost for its high conductivity. The epoxy is selected to have characteristics enabling a moisture and bubble free seal between the container 11 and the chip 20. The capacitor thus constructed can withstand elevated temperature up to 275° C. without the risk of the degradation of the prior art, encountered particularly when components were soldered into circuits. The container 11 may be directly soldered to a circuit. Planar surfaces on the container 11 are advantageous for orientating in assembly and for automated assembly. Effective utility of the planar surfaces is enabled by the present construction. The prior art capacitors of the U.S. Pat. No. 3,789,274 required special coatings and other protection against solder fluxes and were physically fragile.

In effect, the present invention provides an encapsulated capacitor 10 having the advantages of an hermetically sealed capacitor or epoxy encapsulated capacitor, without the bulk and expense of the prior art.

The present invention further does not risk the degradation that a chip 20 may be submitted to by the high heat of hermetic sealing. The capacitor 10 of the present invention further has a temperature safety factor increased over the prior art from 250° C. to 275° C.

In order to be effective, it is preferable for the adhesive sealant to be cured once the chip 20 has been inserted into the container 11. The silver epoxy adhesive 18 is allowed to air dry at about 25° C. for thirty minutes. This allows air bubbles present in the sealant to dissipate so as not to leave voids. The capacitor 10 is then placed in an oven at 135° C. for twenty minutes for a final cure. The curing process evaporates any thinner.

The final step in making the capacitor 10 of the present invention is the conventional sealing of the container 11 with a sealant 19, such as an epoxy. The sealant 19 is filled to the open end of the container 11, air dried to dissipate air bubbles and oven cured at 90° C. for one hour.

The terms and expressions which are employed are used as terms of description; it is recognized, though, that various modifications are possible.

It is also understood the following claims are intended to cover all of the generic and specific features of the invention herein described; and all statements of the scope of the invention which as a matter of language, might fall therebetween.

Having described certain forms of the invention in some detail, what is claimed is:

1. A non-hermetically sealed capacitor resistant to heat degradation up to 275 degrees centigrade comprising a processed chip; said processed chip including at least a solid electrolyte; a dielectric layer; a semi-conductive layer; a conductive layer; and an anode lead, a conductive metal container open at one end, said container including a moisture-proof conductive void-free adhesive material, said container dimensioned to snugly receive said chip, said adhesive material in said container in a volumetric amount to substantially engage said chip free of said lead without voids between said container and said chip, a moisture-proof non-conductive plastic seal, said non-conductive plastic seal adapted to seal said open end of said metal container with said anode lead extending therethrough, said adhesive material and said chip in said container with said plastic seal substantially free of all moisture and voids.

2. The invention of claim 1 wherein said chip further includes an outer conductive layer.

3. The invention of claim 1 wherein said container includes at least one planar surface.

4. The invention of claim 1 wherein said adhesive material is a high temperature silver epoxy.

5. The invention of claim 1 wherein said non-conductive seal is epoxy.

6. The invention of claim 1 wherein said electrolyte is a tantalum.

* * * * *